(12) United States Patent
Nishihama et al.

(10) Patent No.: US 7,129,613 B2
(45) Date of Patent: ***Oct. 31, 2006

(54) ROTATING ELECTRICAL MACHINE AND DRIVE SYSTEM OF CAGE INDUCTION MOTOR

(75) Inventors: Kazuo Nishihama, Hitachi (JP); Kazumasa Ide, Hitachiota (JP); Tetsuo Fujigaki, Hitachi (JP); Shuuji Mizutani, Hitachinaka (JP); Takeshi Nakayama, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/074,745

(22) Filed: Mar. 9, 2005

(65) Prior Publication Data

US 2005/0156476 A1 Jul. 21, 2005

Related U.S. Application Data

(63) Continuation-in-part of application No. 10/775,227, filed on Feb. 11, 2004, now Pat. No. 6,882,078.

(30) Foreign Application Priority Data

Feb. 12, 2003 (JP) .............................. 2003-033280

(51) Int. Cl.
 *H02K 17/16* (2006.01)
(52) U.S. Cl. ..................................................... 310/211

(58) Field of Classification Search ................ 310/211, 310/212, 179, 201
See application file for complete search history.

(56) References Cited

U.S. PATENT DOCUMENTS 2,304,067 A * 12/1942 Anderson .................... 164/493
3,688,141 A 8/1972 Masiennikov et al.
4,139,790 A 2/1979 Steen
4,785,213 A 11/1988 Satake
6,882,078 B1 * 4/2005 Nishihama et al. ......... 310/211

FOREIGN PATENT DOCUMENTS

JP 7-231630 8/1995

OTHER PUBLICATIONS

"Transformer/Induction Machine/AC Commutator Motor" Institute of Electrical Engineers, 6TH Edition, Nov. 21, 1983, pp.311-315.

* cited by examiner

*Primary Examiner*—Darren Schuberg
*Assistant Examiner*—Nguyen N. Hanh
(74) *Attorney, Agent, or Firm*—Dickstein Shapiro LLP

(57) ABSTRACT

A rotor conductor upper portion positioned near to an outer periphery of a rotor has a trapezoidal, cross sectional shape, a rotor conductor lower portion positioned nearer to a center of the rotor than the rotor conductor upper portion has a rectangular, cross sectional shape, and the rotor conductor upper portion has a height $h1=27$ mm or more in the case where rotor conductors are made of brass, and a height $h1=7$ mm or more in the case where the rotor conductors are made of copper.

19 Claims, 7 Drawing Sheets

ROTATING ELECTRICAL MACHINE AND DRIVE SYSTEM OF CAGE INDUCTION MOTOR

This application is a continuation-in-part of application Ser. No. 10/775,227, filed on Feb. 11, 2004 now U.S. Pat. No. 6,882,078, which is hereby incorporated by reference.

BACKGROUND OF THE INVENTION

The present invention relates to a rotating electrical machine, of which a rotor comprises a cage conductor, and a drive system of a cage induction motor.

JP-A-7-231630 discloses a rotating electrical machine, in which rotor conductors of a cage induction motor are sectioned along a plane perpendicular to a shaft to comprise a lower portion enlarged stepwise in width as compared with an upper portion positioned near to an outer periphery of a rotor. Also, "Transformer/induction machine/AC commutator motor" published by Institute of Electrical Engineers, 6th edition, Nov. 21, 1983, pages 311 to 315 (FIG. 3.63, FIG. 3.64, and FIG. 3.67) discloses a rotating electrical machine, in which rotor conductors have the same cross sectional shape as that in JP-A-7-231630 and the cross sectional shape of the rotor conductors over a whole height thereof tapers linearly toward an outer periphery of a rotor to be trapezoidal in shape.

The rotor conductors disclosed in JP-A-7-231630 have an inverted T-shaped cross section such that the upper portions of the rotor conductors positioned near to the outer periphery of the rotor are small in width and the lower portions are enlarged stepwise in width. Therefore, high resistance is generated at the starting of a rotating electrical machine, so that starting characteristics of the rotating electrical machine can be improved. On the other hand, since the rotor conductor is enlarged stepwise in width and the rotating electrical machine is sharply reduced in secondary resistance, the rotating electrical machine is reduced in torque. Also, coming-out of the rotor conductors due to centrifugal forces is restricted only by the steps of the rotor conductors. Therefore, centrifugal forces concentrate on the steps and the rotor conductors are in some cases broken by friction. Further, since the rotor conductors are sharply changed in width, a high technique is needed for processing of the rotor conductors in the case where a drawn material is used for the rotor conductors.

Meanwhile, with the rotating electrical machine of "Transformer/induction machine/AC commutator motor", the cross sectional shape of the rotor conductors tapers over a total height thereof toward the outer periphery of the rotor to be trapezoidal in shape, so that high resistance is generated at the starting of the rotating electrical machine and a starting characteristics of the rotating electrical machine is improved. Since the rotor conductors are trapezoidal-shaped, however, a height thereof and a width of a bottom thereof are determined by restriction in strength, there is little freedom in design, and a starting characteristics and a steady-state characteristics of the rotating electrical machine are not balanced in some cases.

It is an object of the invention to provide a rotating electrical machine having starting characteristics of low starting current and high starting torque, and a good balance between a starting characteristics and a steady-state characteristics.

It is a further object of the invention to provide a drive system of a cage induction motor, in which alternating current with a commercial frequency remaining intact is supplied directly to the induction motor to realize a characteristics of low starting current and high starting torque, and a characteristics of high efficiency and high power factor.

Other objects and features of the invention will be made apparent from the following description of the embodiments.

BRIEF SUMMARY OF THE INVENTION

In one aspect of the invention, the rotor conductors comprise a rotor conductor upper portion, which is positioned near to an outer periphery of a rotor, and a cross sectional shape of which tapers continuously toward the outer periphery of the rotor, and a rotor conductor lower portion, which is contiguous to the rotor conductor upper portion to be positioned nearer to a center of the rotor than the rotor conductor upper portion, and a cross sectional shape of which is made rectangular to have substantially the same width as that of a bottom of the rotor conductor upper portion.

Here, it is desired that a cross sectional shape of the rotor conductor upper portion be trapezoidal to taper linearly toward the outer periphery of the rotor.

In another aspect of the invention, brass is used to make the rotor conductors and the rotor conductor upper portion has a height of not less than 27 mm.

In a further aspect of the invention, copper is used to make the rotor conductors and the rotor conductor upper portion has a height of not less than 7 mm.

In a still further aspect of the invention, the rotor conductor upper portion is made of brass and the rotor conductor lower portion is made of copper.

Owing to these features, a rotating electrical machine is achieved to easily meet demanded steady-state characteristics such as efficiency, power factor, and so on while restricting a starting current and ensuring a starting torque.

In a further aspect of the invention, the rotor conductors comprise a rotor conductor upper portion, which is positioned near to an outer periphery of a rotor, and a cross sectional shape of which tapers continuously toward the outer periphery of the rotor, and a rotor conductor lower portion, which is contiguous to the rotor conductor upper portion to be positioned nearer to a center of the rotor than the rotor conductor upper portion, and a cross sectional shape of which is made rectangular to have substantially the same width as that of a bottom of the rotor conductor upper portion, and a switch is provided for applying to the stator coils voltage of a commercial three-phase AC power supply with a commercial frequency remaining intact.

Therefore, a drive system of a cage induction motor is provided to restrict a starting current of a three-phase induction motor, to which three-phase alternating current with a commercial frequency is supplied directly, and generate an adequate starting torque and to exhibit an excellent steady-state characteristics such as efficiency, power factor, and so on.

In yet a further aspect of the invention, the rotor conductor comprises a rotor conductor upper portion, which is positioned on a side of an outer periphery of a rotor, and a cross sectional shape of which tapers toward the outer periphery of the rotor, and a rotor conductor lower portion, which is positioned nearer to a center of the rotor than the rotor conductor upper portion, and a cross sectional shape of which has substantially the same width as that of a bottom of the rotor conductor upper portion.

In a further aspect of the invention, the rotor conductors comprise a rotor conductor upper portion, which is positioned on a side of an outer periphery of a rotor, and a cross sectional shape of which has a trapezoidal, cross sectional shape, and a rotor conductor lower portion, which is positioned nearer to a center of the rotor than the rotor conductor upper portion, and a cross sectional shape of which has substantially the same width as that of a bottom of the rotor conductor upper portion.

In another aspect of the invention, the rotor conductors comprise a rotor conductor upper portion, which is positioned on a side of an outer periphery of a rotor, and a cross sectional shape of which tapers toward the outer periphery of the rotor, and a rotor conductor lower portion, which is positioned nearer to a center of the rotor than the rotor conductor upper portion, and a cross sectional shape of which is made rectangular to have substantially the same width as that of the rotor conductor upper portion.

Accordingly, both starting characteristics and steady-state characteristics are improved.

Other objects and features of the invention will be made apparent from the following description of the embodiments.

DESCRIPTION OF THE PREFERRED EMBODIMENTS

The invention will be described below in detail on the basis of embodiments as shown.

Figure 1:
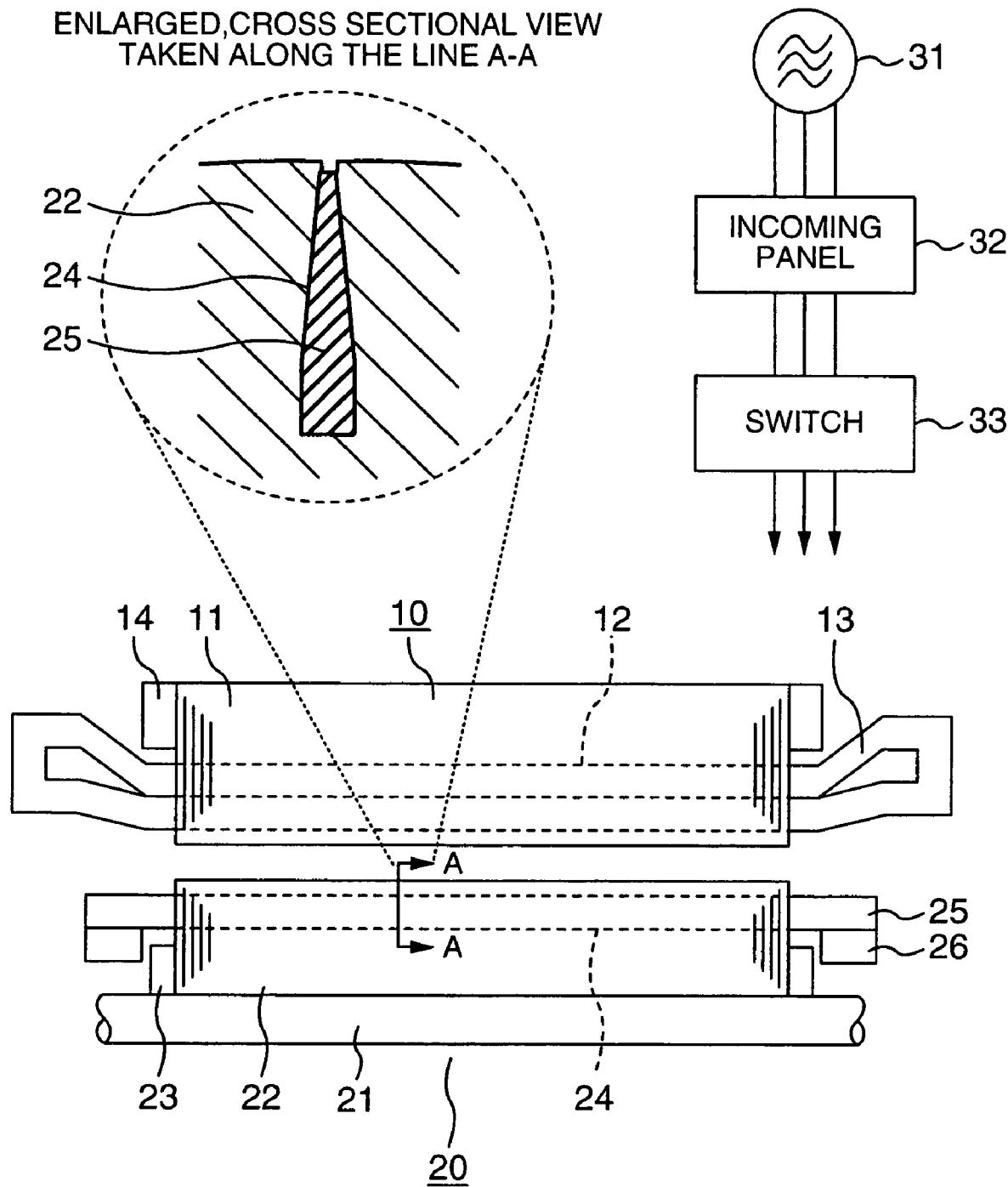
FIG. 1 includes a cross sectional view showing an essential part of a cage induction motor according to an embodiment of the invention and a view showing a configuration of a drive system.

FIG. 1 includes a cross sectional view showing an axial cross section of an upper half of a cage induction motor according to an embodiment of the invention and a view showing a configuration of a drive system of the induction motor. A stator 10 of the cage induction motor comprises a stator core 11, a multiplicity of stator slots 12 formed at spaces near to an inner periphery of the stator core 11, and stator coils 13 embedded in the slots 12. The stator core 11 comprises an axial laminate, both ends of which are secured by core holding members 14.

Meanwhile, a rotor 20 comprises a rotor core 22 laminated on and fitted into a shaft 21, both ends of the rotor core being secured by core holding members 23. A multiplicity of slots 24 are formed at spaces near to an outer periphery of the rotor core 22 to extend radially, and rotor conductors 25 are provided to be embedded into the slots 24. The reference numeral 26 denotes a short ring.

The invention achieves an improvement in configurations of the rotor slots 24 and the rotor conductors 25 received therein. As shown in an enlarged, cross sectional view taken along the line A—A, with the embodiment, a cross sectional shape of the rotor conductors 25 is composed of an upper trapezoidal-shaped portion tapered linearly toward an outer periphery of the rotor and a lower rectangular-shaped portion contiguous to the upper portion and having substantially the same width as that of a bottom of the upper portion. This will be described in detail later.

Also, provided as a power-supply unit is a switch 33, by which three-phase alternating current received by an incoming panel 32 from a commercial three-phase AC power supply 31 is supplied to the stator coil 13 of the three-phase induction motor while a commercial frequency remains intact (through non-medium of any variable frequency inverter).

Figure 2:
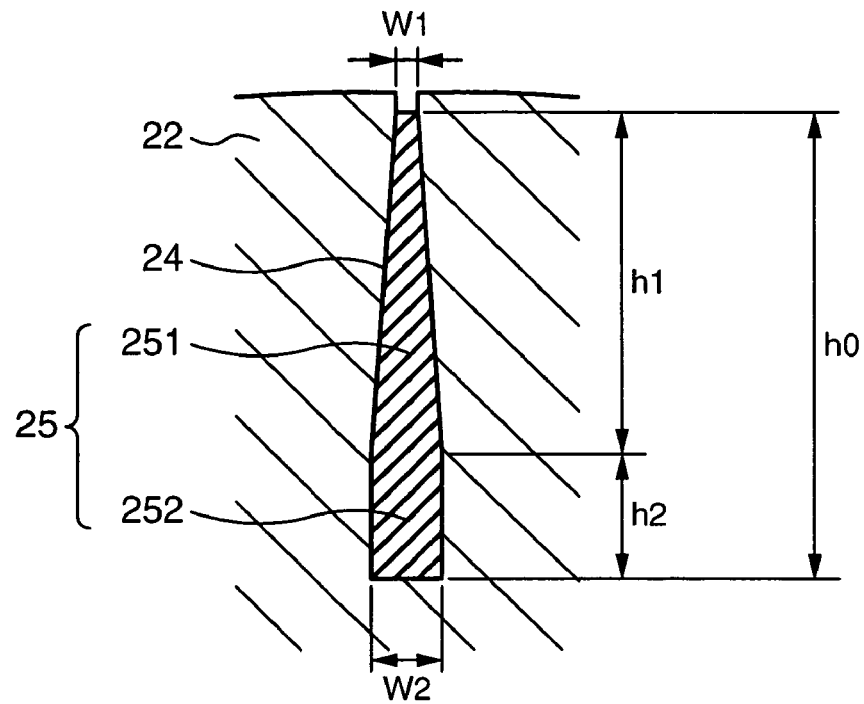
FIG. 2 is a cross sectional view showing an essential part of a rotor according to the embodiment of the invention.

FIG. 2 is an enlarged view showing an essential part of the rotor 20, according to the embodiment of the invention, as sectioned in a direction perpendicular to the shaft. A plurality of the rotor slots 24 are provided at predetermined spaces in a circumferential direction of the rotor core 22 and the rotor conductors 25 are received in the slots 24. In the case of a cage induction motor of 10 MW class, the rotor conductors 25 have, for example, a total height $h0=60$ mm, and a ratio $W1/W2=1/3.25$ of a width $W1$ at an upper end thereof and a width $W2$ at a base thereof. Here, a rotor conductor upper portion 251 positioned near to the outer periphery of the rotor 20 and having a height dimension $h1$ has a trapezoidal, cross sectional shape linearly tapering toward the outer periphery of the rotor. Meanwhile, a rotor conductor lower portion 252 positioned contiguous to the rotor conductor upper portion 251 and nearer to a center of the rotor 20 than the rotor conductor upper portion 251 and having a height dimension $h2$ has a rectangular, cross sectional shape having a width $W2$ substantially equal to a bottom of the upper portion 251.

According to the first embodiment, the rotor conductor upper portion 251 positioned near to the outer periphery of the rotor 20 has a cross sectional shape linearly tapering toward the outer periphery of the rotor 20 and thus being trapezoidal. However, the cross sectional shape is not necessarily linear but can be curved gently.

With the cage induction motor, current passes through the whole rotor conductors 25 in a steady state while current passes only in the vicinity of outer peripheries of the rotor conductors 25 due to influences of the skin effect at the starting. Therefore, by tapering the width $W1$ of the rotor conductor upper portion 251, according to the embodiment, near to the outer periphery of the rotor 20, secondary leakage reactance is increased at the starting and so a starting current can be reduced. Also, by tapering the width $W1$ near to the outer periphery of the rotor, secondary resistance is increased at the starting and so a starting torque can be increased. Further, by making the width $W2$ near to the center of the rotor larger than the width $W1$ near to the outer periphery of the rotor, an increase in secondary leakage reactance and secondary resistance is restricted, so that an improvement in characteristics in a steady state can be achieved.

Figure 3:
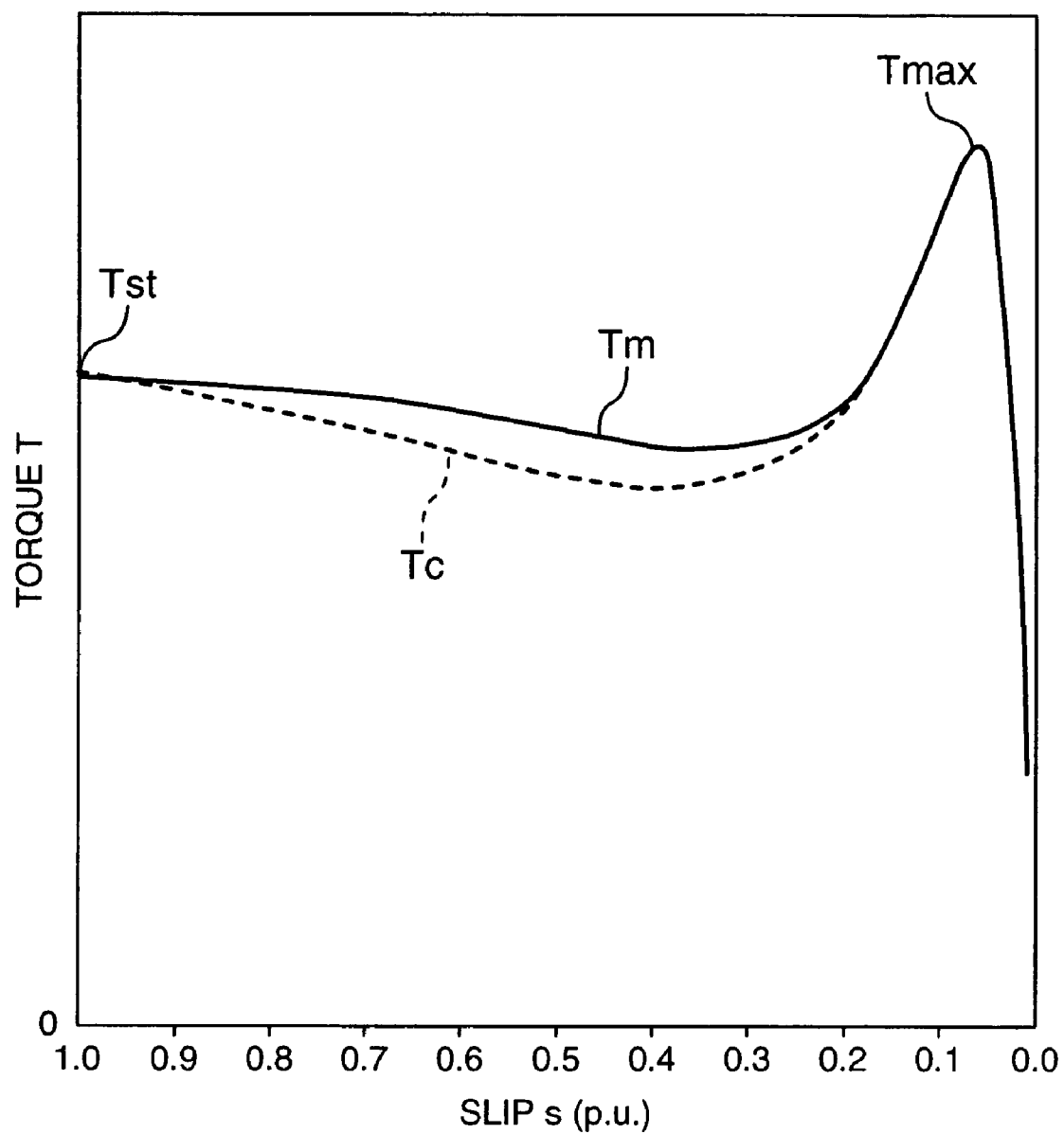
FIG. 3 is a graph indicating slip/torque characteristics of the induction motor according to the embodiment of the invention.

FIG. 3 is a graph indicating a slip versus torque characteristics of the induction motor, according to the first embodiment of the invention, in contrast to that of JP-A-7-

231630. With a construction of JP-A-7-231630, a starting torque Tst and a maximum torque Tmax are good but a width of rotor conductors is sharply increased in a stepwise manner and secondary resistance is sharply reduced. Therefore, a motor torque Tc is reduced around a middle speed, that is, in the vicinity of slip s=0.5 as shown in the figure. In contrast, with the construction of the rotor conductors 25 according to the embodiment, a width of the rotor conductors 25 is gently increased from W1 to W2, and so it is possible to obtain a torque characteristics Tm free from torque reduction in the vicinity of a middle speed.

Also, with the construction of JP-A-7-231630, coming-out of rotor conductors due to centrifugal forces is restricted only by the inverted T-shaped steps. Therefore, centrifugal forces concentrate on the steps and the rotor conductors are in some cases broken by friction. In contrast, with the rotor conductors 25 according to the embodiment, a whole inclination portion of the upper portion shown in FIG. 2 extending over the height h1 sustains coming-out of the rotor conductor 25 due to centrifugal forces. Accordingly, it is possible to relax concentration of centrifugal forces to prevent breakage of the rotor conductors 25 due to friction as compared with the construction of JP-A-7-231630.

Further, in the case where a drawn material is used for the rotor conductors 25, the construction of JP-A-7-231630 needs a high technique for processing of the rotor conductors since a width of the rotor conductors is sharply changed in a stepwise manner. Meanwhile, the rotor conductors 25 according to the embodiment involve no sharp configurational change in that portion thereof, in which a width thereof changes from W1 to W2, so that drawing of the rotor conductors 25 is made easy.

Meanwhile, with the rotating electrical machine of "Transformer/induction machine/AC commutator motor", in which rotor conductors are inclined over a total height thereof to be trapezoidal in shape, the rotor conductors are restricted in height h0 and widths W1, W2 at upper and lower ends thereof due to the trapezoidal shape thereof. Therefore, there is no freedom in design, and starting characteristics and steady-state characteristics are not appropriately balanced in some cases. In contrast, with the construction of the rotor conductors 25 according to the embodiment, it is possible to freely select a height h1 for the rotor conductor upper portions 251 and a height h2 for the rotor conductor lower portions 252. Accordingly, there is produced freedom in design, and starting characteristics and steady-state characteristics are appropriately balanced with ease.

Hereupon, a rotating electrical machine having the rotor conductors 25 according to the invention is effective specifically in large-sized cage induction motors, in which the switch 33 shown in FIG. 1 leads the commercial three-phase AC power supply 31 in directly for use while a commercial frequency remains intact. It is thought that large-sized cage induction motors generally have the same efficiency in rated operation as or higher than that of converter/ inverters. Therefore, it can be said that the drive system of the cage induction motor, according to the embodiment, leading a commercial three-phase AC power supply in directly for use is a motor system having a highest efficiency in rated operation for use at a constant speed.

Also, a demand for reducing a power supply facility for rotating electrical machines in capacity to reduce an initial cost thereof is deep-rooted. Accordingly, existence of the rotating electrical machine according to the invention is significant, which machine does not need any converter/ inverter and unites the starting characteristics of low starting current and high starting torque and the steady-state characteristics of high efficiency and high power factor.

Figure 4:
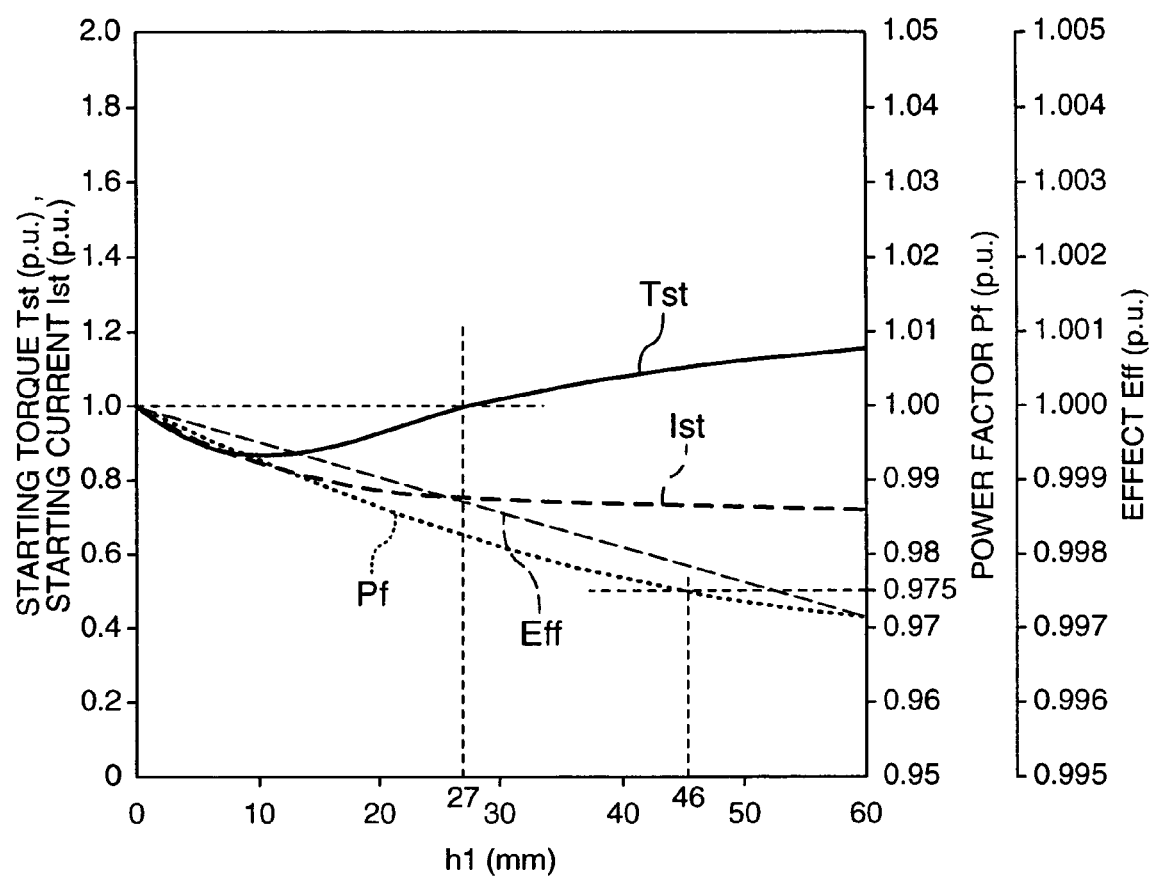
FIG. 4 is a graph indicating starting characteristics and steady-state characteristics of the induction motor according to the embodiment of the invention.

FIG. 4 is a graph indicating starting characteristics and steady-state characteristics of a cage induction motor according to an embodiment of the invention. Taken as an example are rotor conductors 25 having a total height h0=60 mm and provided in the cage induction motor of 10 MW class described above. The graph indicates a starting current Ist, a starting torque Tst, a power factor Pf in a steady state, and efficiency Eff in a steady state in the case where brass is used for the rotor conductors 25 and a height h1 of rotor conductor upper portions 251 is varied. Based on the characteristics, the rotor conductor upper portions 251 in the embodiment of the invention have a height h1=27 mm or more. It is found that when the height h1 is not less than 27 mm, the starting current Ist can be reduced to less than 80% while ensuring a starting torque Tst not less than that in the case where the height h1 is 0 mm, that is, the rotor conductors are configured to be rectangular over the entire height (left end in the figure). In addition, when the height h1 is not more than 27 mm, the starting torque Tst is also reduced though the starting current Ist can be reduced.

Also, as apparent from the figure, it is desired that an upper limit of the height h1 of the upper portions 251 of the rotor conductors be not more than h1=46 mm in order to ensure a power factor 0.975 in a steady state. This results in ensuring a height h2 of ten and several mm or more for the lower portions 252 of the rotor conductors 25 and ensuring an efficiency in a steady state.

Figure 5:
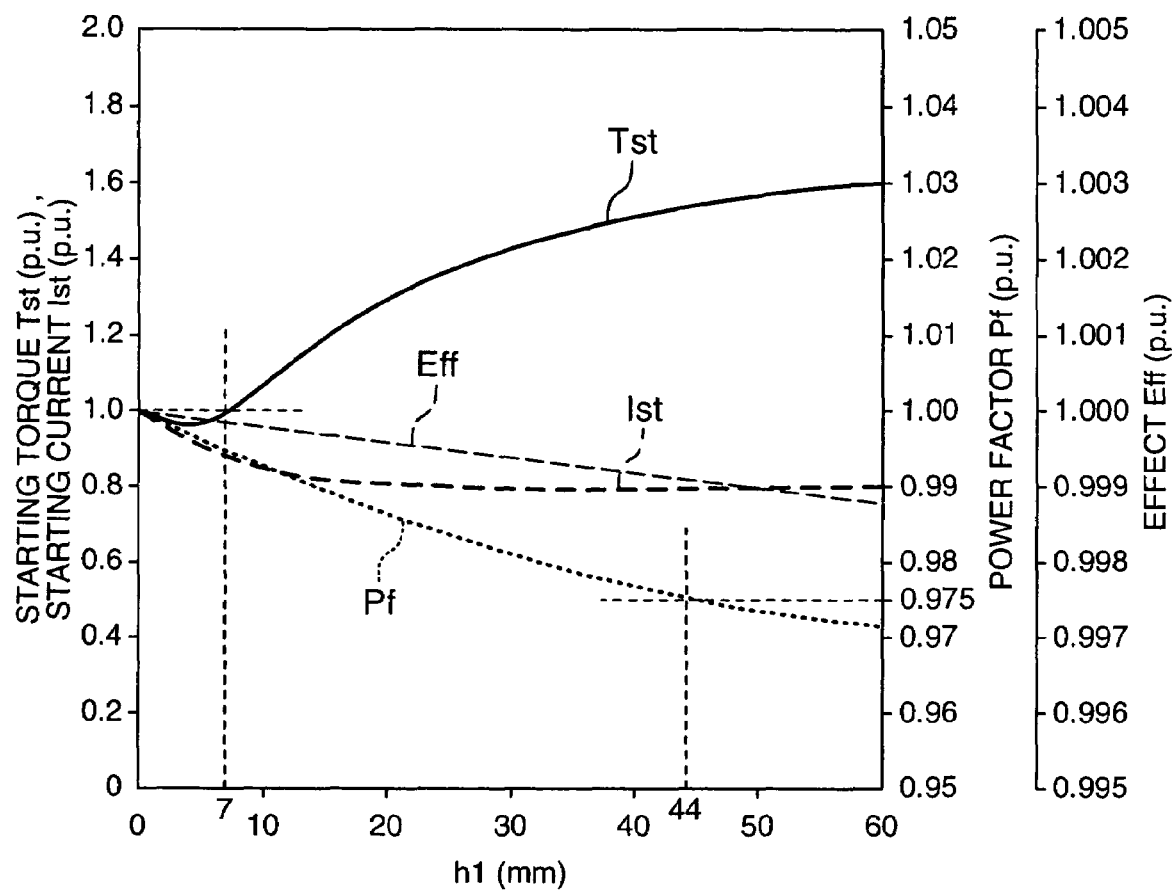
FIG. 5 is a graph indicating starting characteristics and steady-state characteristics of an induction motor according to a further embodiment of the invention.

FIG. 5 is a graph indicating starting characteristics and steady-state characteristics of a cage induction motor according to a further embodiment of the invention. Likewise, copper is used for rotor conductors 25 having a total height h0=60 mm and provided in a cage induction motor of 10 MW class. Like that in FIG. 4, the graph indicates a starting current Ist, a starting torque Tst, a power factor Pf in a steady state, and an efficiency Eff in a steady state in the case where a height h1 of rotor conductor upper portions 251 is varied. Based on the characteristics, the rotor conductor upper portions 251 in the embodiment have a height h1=7 mm or more. It is found that when the height h1 is not less than 7 mm, the starting current Ist can be reduced to less than 90% while ensuring a starting torque Tst not less than that in the case where the rotor conductors have a height h1=0 mm and are configured to be rectangular (left end in the figure). In addition, when the height h1 is not more than 7 mm, the starting torque Tst is also reduced though the starting current Ist can be further reduced.

Also, as apparent from the figure, it is desired that an upper limit of the height h1 of the upper portions 251 of the rotor conductors 25 be not more than 44 mm in order to ensure a power factor of 0.975 in a steady state. This results in ensuring a height of ten and several mm or more for the lower portions 252 of the rotor conductors 25 and ensuring efficiency in a steady state.

Figure 6:
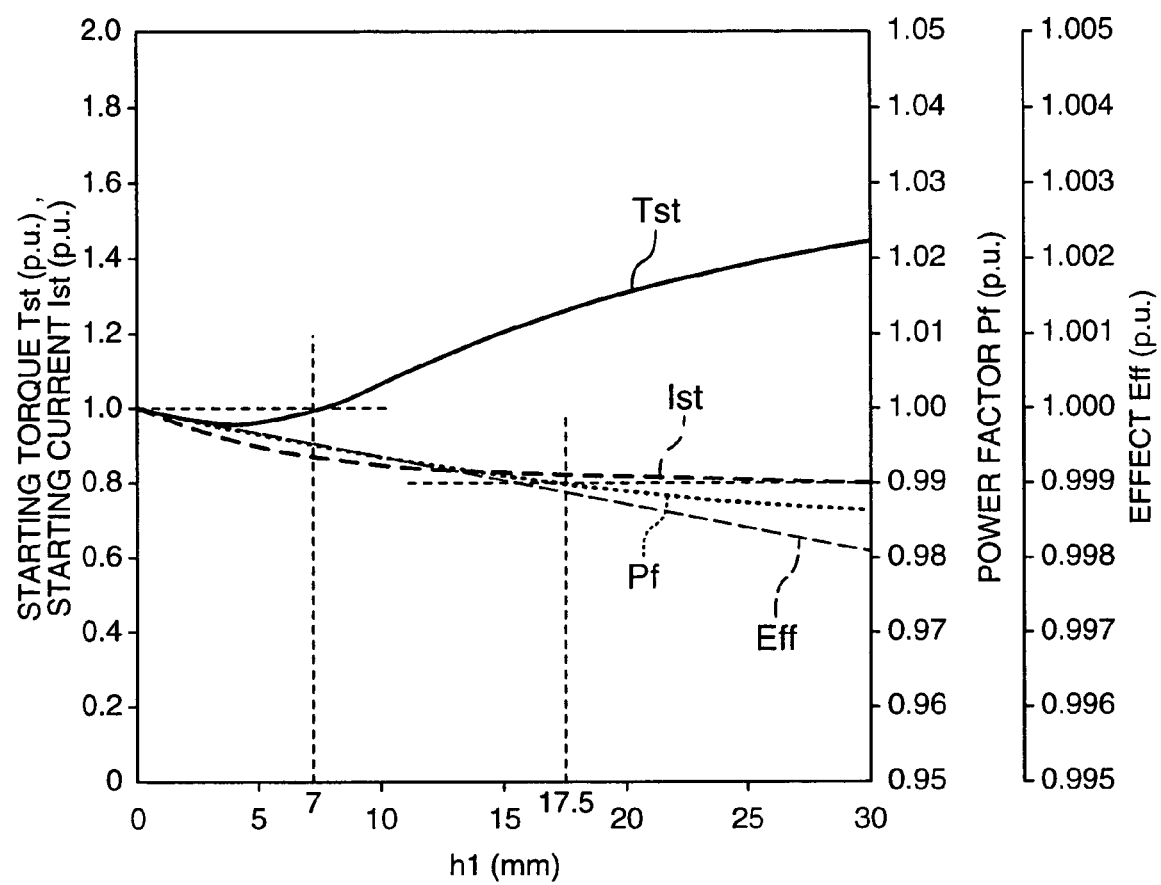
FIG. 6 is a graph indicating a starting characteristics and a steady-state characteristics of an induction motor according to a still further embodiment of the invention.

FIG. 6 is a graph indicating starting characteristics and steady-state characteristics of a cage induction motor according to a still further embodiment of the invention. Copper is used for rotor conductors 25 having a total height h0=30 mm and provided in a cage induction motor of 100 MW class. Like those in FIGS. 4 and 5, the graph indicates a starting current Ist, a starting torque Tst, a power factor Pf in a steady state, and efficiency Eff in a steady state in the case where a height h1 of rotor conductor upper portions 251 is varied. Based on the characteristics, the rotor conductor upper portions 251 in the embodiment have a height h1=7 mm or more. It is found that when the height h1 is not less than 7 mm, the starting current Ist can be reduced to less than 90% while ensuring a starting torque Tst not less than that in the case where the rotor conductors have a height h1=0 mm and are configured to be rectangular (left end in the figure). In addition, when the height h1 is not more than 7 mm, the starting torque Tst is also reduced though the starting current Ist can be reduced.

Also, as apparent from the figure, it is desired that an upper limit of the height h1 of the upper portions 251 of the rotor conductors 25 be not more than 17.5 mm in order to ensure a power factor of 0.99 for induction motors of this class in a steady state. This results in fully ensuring a height 2 for the rotor conductor lower portions 252 to obtain a high efficiency in a steady state.

Figure 7:
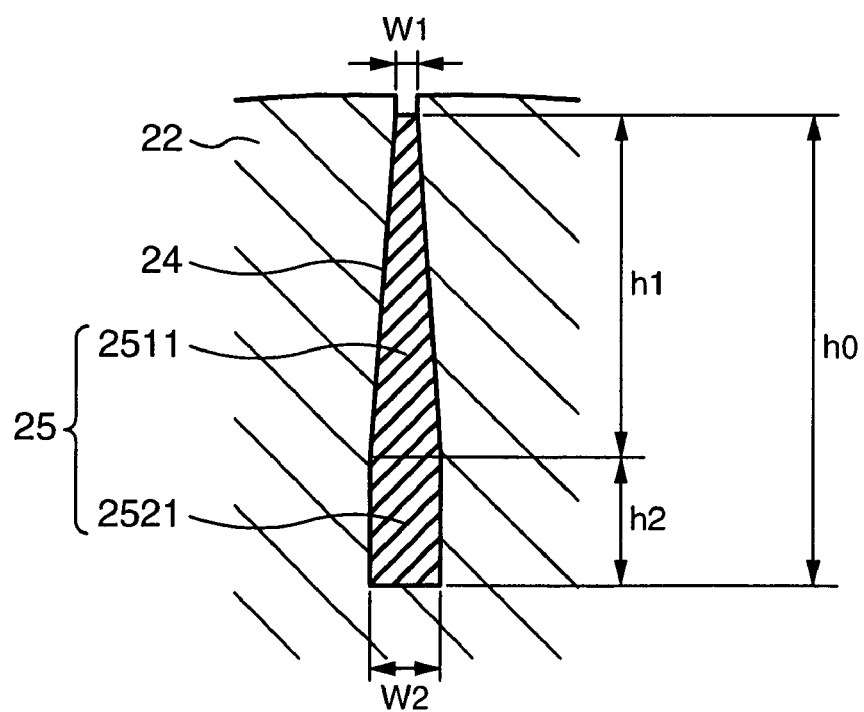
FIG. 7 is a cross sectional view showing an essential part of a rotor according to a further embodiment of the invention.

FIG. 7 is an enlarged view showing an essential part of a rotor 20, according to a further embodiment of the invention, as sectioned in a direction perpendicular to a shaft. A plurality of rotor slots 24 are provided at predetermined spaces in a circumferential direction of a rotor core 22 and rotor conductors 25 are received in the slots 24.

In the embodiment, the rotor conductors 25 comprise a rotor conductor upper portion 2511, which is made of brass and positioned near to an outer periphery of a rotor 20, and a rotor conductor lower portion 2521, which is made of copper to be positioned contiguous to a bottom of the rotor conductor upper portion 2511 and near to a center of the rotor. And the rotor conductor upper portion 2511 has a cross sectional shape continuously tapering toward to an outer periphery of the rotor 20, and the rotor conductor lower portion 2521 has a rectangular cross sectional shape having substantially the same width as that of the bottom of the rotor conductor upper portion 2511.

In this manner, the rotor slots 24 and the rotor conductors 25 are shaped in the same manner as in the embodiment shown in FIG. 2, and have the same dimensions as those illustrated in FIGS. 2 and 4.

As described above, with the cage induction motor, current passes through the whole rotor conductors 25 in a steady state while current passes only in the vicinity of the outer peripheries of the rotor conductors 25 at the starting due to influences of the skin effect. Therefore, those rotor conductor upper portion 2511, according to the embodiment, which are made of brass to be high in specific resistivity, increase secondary reactance at the starting, thus enabling the starting torque in the same manner as in the embodiment shown in FIG. 2. Also, the use of copper of low specific resistivity for the rotor conductor lower portions near the center of the rotor restricts loss in the rotor conductor lower portions 2521 in a steady state to be able to achieve a higher efficiency than that in the embodiment shown in FIG. 2.

Figure 8:
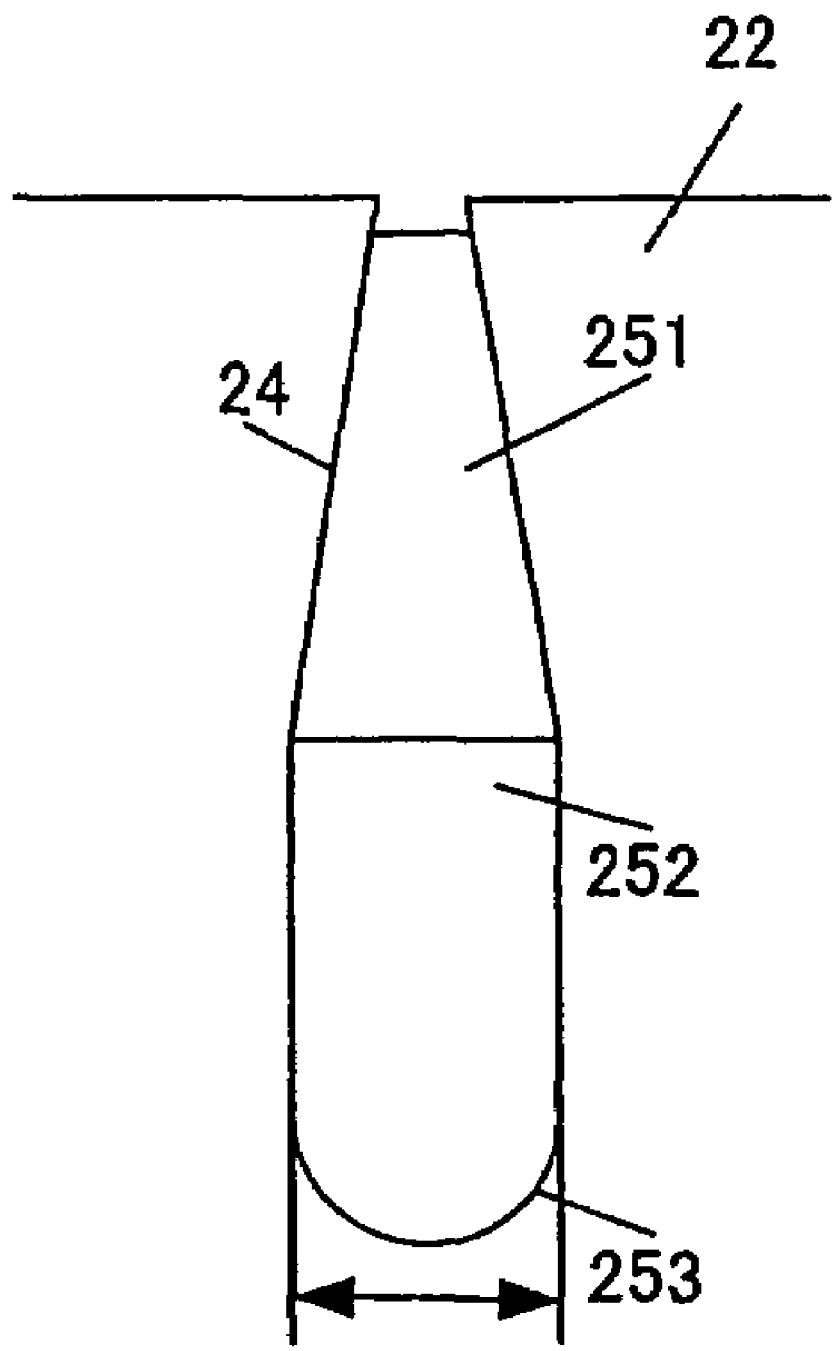
FIG. 8 is a cross sectional view showing an essential part of a rotor according to a further embodiment of the invention.

The cross sectional shape of the rotor conductor lower portion does not have to be made rectangular. In FIG. 8, for example, a bottom portion 253 of the rotor conductor lower portion 252 may be made half-rounded.

When the rotor conductor upper portion has a trapezoidal, cross sectional shape which tapers toward the outer periphery of the rotor, and the width W3 of the cross sectional shape of the rotor conductor upper portion is substantially same as the width W4 of the cross sectional shape of the rotor conductor lower portion, both starting characteristics and steady-state characteristics are improved.

According to the invention, it is possible to provide a rotating electrical machine having characteristics of low starting current and high starting torque and a good balance between a starting characteristics and steady-state characteristics.

Also, it is possible to provide a drive system of a cage induction motor, in which alternating current with a commercial frequency remaining intact is supplied directly to the induction motor, and achieves a characteristics of low starting current and high starting torque and a characteristics of high efficiency and high power factor.

It should be further understood by those skilled in the art that although the foregoing description has been made on embodiments of the invention, the invention is not limited thereto and various changes and modifications may be made without departing from the spirit of the invention and the scope of the appended claims.

What is claimed as new and desired to be protected by Letters patent of the United States is:

1. A rotating electrical machine comprising:
   a rotor core,
   a plurality of rotor slots radially provided at predetermined spaces in a circumferential direction of the rotor core, and
   a plurality of rotor conductors, respectively, received in the plurality of rotor slots, wherein the plurality of rotor conductors comprise:
      a rotor conductor upper portion, which is positioned near to an outer periphery of a rotor, and has a trapezoidal cross sectional shape which tapers continuously toward the outer periphery of the rotor, and
      a rotor conductor lower portion, which is contiguous to the rotor conductor upper portion to be positioned nearer to a center of the rotor than the rotor conductor upper portion, and a cross sectional shape of which has substantially the same width as that of a bottom of the rotor conductor upper portion.

2. The rotating electrical machine according to claim 1, wherein the rotor conductor upper portion tapers linearly toward the outer periphery of the rotor.

3. The rotating electrical machine according to claim 1, wherein brass is used to make the plurality of rotor conductors, and the rotor conductor upper portion has a height of not less than 27 mm.

4. The rotating electrical machine according to claim 1, wherein brass is used to make the plurality of rotor conductors, and the rotor conductor upper portion has a height of 27 to 46 mm.

5. The rotating electrical machine according to claim 1, wherein copper is used to make the plurality of rotor conductors, and the rotor conductor upper portion has a height of not less than 7 mm.

6. The rotating electrical machine according to claim 1, wherein copper is used to make the plurality of rotor conductors, and wherein the plurality of rotor conductors have a total height of not less than 60 mm, and the rotor conductor upper portion has a height of 7 to 44 mm.

7. The rotating electrical machine according to claim 1, wherein copper is used to make the plurality of rotor conductors, and wherein the plurality of rotor conductors have a total height of not less than 30 mm, and the rotor conductor upper portion has a height of 7 to 17.5 mm.

8. A rotating electrical machine comprising a rotor core, a plurality of rotor slots radially provided at predetermined spaces in a circumferential direction of the rotor core, and a plurality of rotor conductors, respectively, received in the plurality of rotor slots;
   wherein the plurality of rotor conductors comprise a rotor conductor upper portion made of brass and positioned near to an outer periphery of a rotor, and a rotor conductor lower portion made of copper contiguous to a bottom of the rotor conductor upper portion to be positioned nearer to a center of the rotor than the rotor conductor upper portion; and wherein the rotor conductor upper portion has a trapezoidal cross sectional shape tapering continuously toward the outer periphery of the rotor, and the rotor conductor lower portion has a rectangular cross sectional shape having substantially the same width as that of the bottom of the rotor conductor upper portion.

9. The rotating electrical machine according to claim 8, wherein the rotor conductor upper portion tapers linearly toward the outer periphery of the rotor.

10. The rotating electrical machine according to claim 8, wherein the rotor conductor upper portion is made of brass, and has a height of not less than 27 mm.

11. The rotating electrical machine according to claim 8, wherein the rotor conductor upper portion is made of brass, and has a height of 27 to 46 mm.

12. A drive system of a cage induction motor comprising a stator core, a plurality of stator slots radially provided at predetermined spaces and around an inner periphery of the stator core, a stator comprising stator coils received in the stator slots, a rotor core, a plurality of rotor slots radially provided at predetermined spaces in a circumferential direction of the rotor core, a cage induction motor comprising rotor conductors received in the rotor slots, a power supply for supplying three-phase alternating current to the cage induction motor, wherein the rotor conductors comprise at least one rotor conductor upper portion, which is positioned near to an outer periphery of a rotor, and has a trapezoidal cross sectional shape which tapers continuously toward the outer periphery of the rotor, and a corresponding rotor conductor lower portion, which is contiguous to the rotor conductor upper portion and is positioned nearer to a center of the rotor than the rotor conductor upper portion, and a cross sectional shape of which has substantially the same width as that of a bottom of the rotor conductor upper portion, and a switch for applying to the stator coils voltage of a commercial three-phase AC power supply.

13. The drive system according to claim 12, wherein the rotor conductor upper portion tapers linearly toward the outer periphery of the rotor.

14. The drive system according to claim 12, wherein brass is used to make the rotor conductors, and the rotor conductor upper portion has a height of not less than 27 mm.

15. The drive system according to claim 12, wherein copper is used to make the rotor conductors, and the rotor conductor upper portion has a height of not less than 7 mm.

16. The drive system according to claim 12, wherein the rotor conductor upper portion is made of brass, and the rotor conductor lower portion is made of copper.

17. The drive system according to claim 12, wherein the rotor conductor upper portion is made of brass and tapers linearly toward the outer periphery of the rotor and has a trapezoidal cross sectional shape.

18. The drive system according to claim 12, wherein the rotor conductor upper portion made of brass, and has a height of not less than 27 mm.

19. The drive system according to claim 12, wherein the switch applies to the stator coil voltage a commercial three-phase AC power supply with a commercial frequency remaining intact.

* * * * *